Dec. 8, 1959   E. J. WENDELL   2,916,254
ROTARY VALVES
Filed Dec. 13, 1954   2 Sheets-Sheet 1

INVENTOR:
EVERT J. WENDELL
BY Howson & Howson
ATTYS.

Dec. 8, 1959    E. J. WENDELL    2,916,254
ROTARY VALVES
Filed Dec. 13, 1954    2 Sheets-Sheet 2
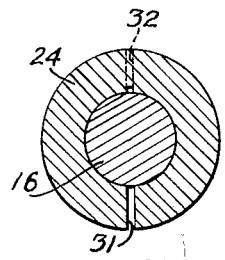
FIG.4.
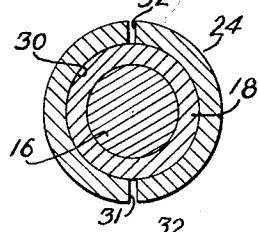
FIG.5.
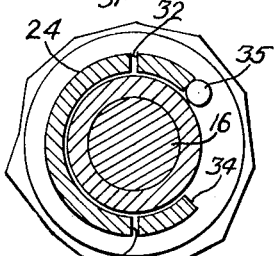
FIG.6.
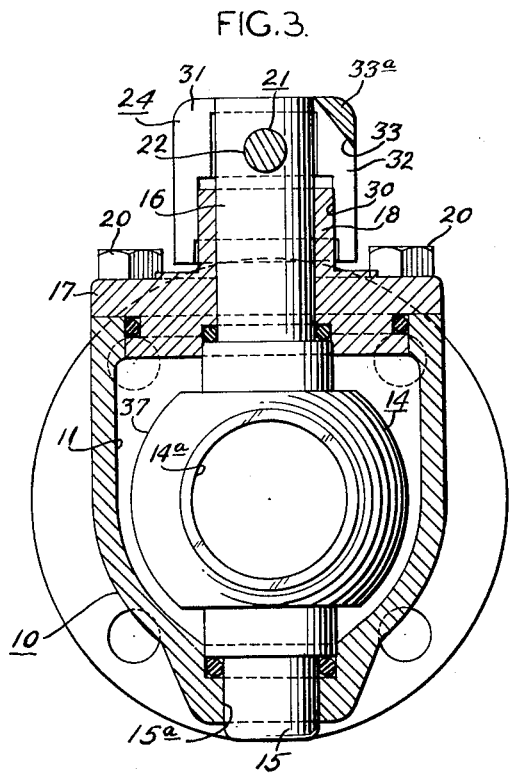
FIG.3.
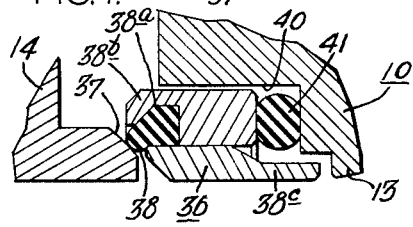
FIG.7.    FIG.8.
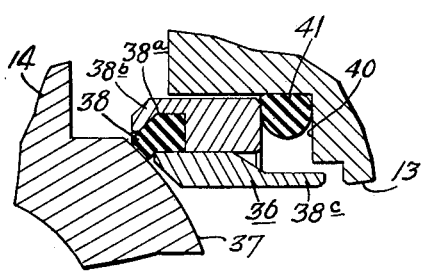
FIG.9.    FIG.10.
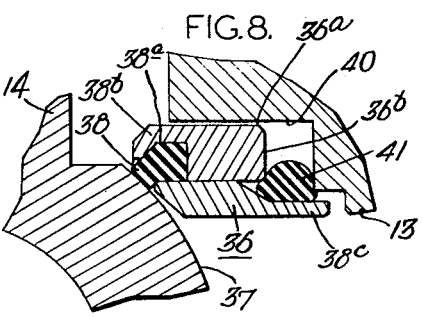
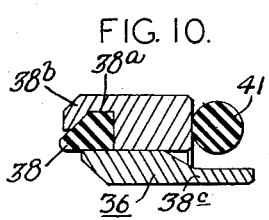
INVENTOR:
EVERT J. WENDELL
BY Howson & Howson
ATTYS.

United States Patent Office 2,916,254
Patented Dec. 8, 1959

2,916,254

ROTARY VALVES

Evert J. Wendell, Wayne, Pa., assignor to Hale Fire Pump Company, Conshohocken, Pa., a corporation of Pennsylvania Application December 13, 1954, Serial No. 474,781

5 Claims. (Cl. 251—172)

The present invention relates to valves and more particularly to valves of the rotary type adapted for controlling the discharge of fluids under relatively high pressures.

While the present invention applies to valves regulating both low and high pressures, it is to the latter that it is more specifically directed. Thus in valves handling high fluid pressures the effective sealing against leakage becomes a problem because rubber and other elastic materials tend to yield and fail to maintain the desired tight seal. In many instances the effect of the applied high pressure may be to blow out gaskets between bolted parts and particularly about the valve seat.

Some of the objects of the present invention are:

To provide an improved valve seat functioning to prevent leakage under all normal working pressures;

To provide a valve seat comprising means responsive to operating conditions to increase the sealing action as a function of the pressure;

To provide a valve seat that will operate with equal effectiveness in the sealing function regardless of which side of the valve is exposed to the fluid pressure source;

To provide a valve seat wherein the seat is formed by a movable insert in association with pressure responsive means controlling position of the insert to maintain seal;

To provide a valve seat wherein the properties of a substantially non-compressible material flowable under pressure are utilized to maintain the seating joint of a valve sealed against leakage;

To provide a valve which may be operated manually at high pressures with a minimum amount of effort;

To provide a valve having provision for preventing leakage over a wide range of working pressures;

To provide a valve adapted for installation in a pipe line and which can be serviced without removal of the valve casing from the line;

To provide a novel means for locking a valve in its open, closed and intermediate positions;

To provide a valve control wherein a hand operated lever operates not only to open and close the valve but also to actuate a means for locking the valve in one or another of its alternative positions;

To provide a novel valve assembly wherein provision is made for opening and closing a valve including means for locking the valve in adjusted position and including a pressure operative means for maintaining a leak-proof seating means for the valve;

To provide a valve having the aforesaid multiple advantageous characteristics and which shall be characterized also by simplicity and economy of construction.

In the accompanying drawings:

Fig. 3 is a section on line 3—3 of Fig. 2;

Fig. 4 is a section on line 4—4 of Fig. 2;

Fig. 5 is a section on line 5—5 of Fig. 2;

Fig. 6 is a section on line 6—6 of Fig. 2;

Fig. 7 is an enlarged sectional detail view showing the elements of the leak-proof seal as assembled, the valve being shown in open position;

Fig. 8 is a similar view showing the valve closed and the elements of the seal in the sealing positions which they assume under fluid pressure applied at one side of the valve;

Fig. 9 is a like detail view showing the said elements in the positions assumed under pressure applied at the opposite side of the valve, and Fig. 10 is a fragmentary sectional view illustrating a further detail of the invention.

Figure 1:
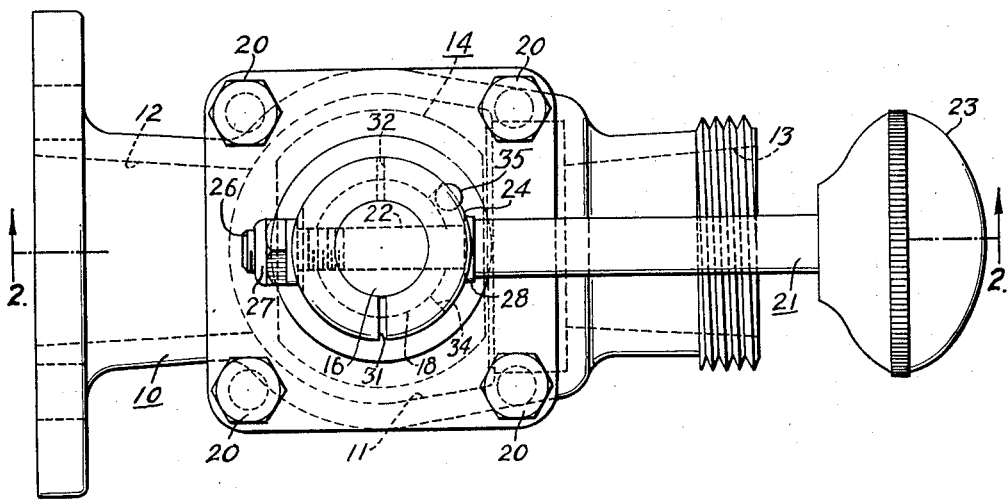
Fig. 1 is a plan view of a valve embodying one form of the present invention.

Referring to the drawings, one embodiment of the invention comprises a valve casing 10 having a valve chamber 11 communicating with two ports 12 and 13, one of which serves as an inlet for fluid under pressure and the other as a discharge outlet according to the direction of fluid flow. In the present instances the two ports 12 and 13 are in axial alignment for straight through flow but may be angularly disposed according to conditions of use.

The chamber 11 houses a rotary valve element 14 in the form of a truncated sphere arranged to rotate about a vertical axis defined by a trunnion 15 journalled in a wall of the casing 10 and a stem 16 which is journalled in a cover plate 17 constituting an element of the casing and which has an integral collar 18 forming an extended bearing for the said stem. The cover plate 17 is attached to the body of casing 10 by studs 20 or other suitable fastening means. The valve stem 16 extends from the collar 18 for attachment of a valve-operating hand lever 21 which passes through a transverse hole in the stem 16. The stem hole and the mating portion 22 of the lever are cylindrical in this instance to permit turning of the lever 21 about its own axis relative to the stem for a purpose hereinafter described. As so assembled the lever 21 can be moved angularly about the axis of the stem for valve control and can also be turned about its own longitudinal axis. The lever 21 terminates at one end in a hand knob 23.

In order to lock the valve 14 in any position, to which it may have been adjusted in the chamber 11 by actuation of the lever 21, a locking sleeve 24 is provided having a bore 25, which receives the valve stem 16, and having also diametrically opposite apertures for passage of the part 22 of the lever. The terminal end 26 of the lever projects beyond the outer face of the sleeve 24 and is threaded and a self-locking nut 27 is threaded upon the end 26 to secure the lever in the sleeve. The threaded end 26 of the lever also finds mating threads 26a in the wall of the sleeve 24. A collar 28 is formed on the lever 21 to abut the opposite outer face of the said sleeve. The sleeve 24 also has a larger bored extension 30 which snugly embraces the collar 18. The sleeve has diametrically opposite slots 31 and 32, which parallel the axis of the stem 16 and which lie in a vertical plane intersecting the axis of the lever 21. The slot 31 extends the full axial length of and therefore splits the sleeve. The slot 32 extends continuously from the lower end of the sleeve to a line 33 near the top, so that a small section of metal 33a remains to hold the two halves of the sleeve together.

With the foregoing construction, if the lever 21 is turned clockwise, as viewed in Fig. 3 and assume a right hand screw thread at 26, 26a, the two halves of the sleeve 24 on opposite sides of the slots 31, 32 will be drawn together, with flexure along or in the area of the line 33. In this manner the sleeve will be brought into clamping relation with the collar 18 of the casing which will have the effect of anchoring the stem 16 (and valve 14) to the casing. If the lever is then turned counterclockwise about its axis from the clamping position, the sleeve will be expanded and freed from the collar 18, and the valve will then be free for adjustment in the chamber 11 about the common axis of the stem 16 and trunnion 15 by manipulation of the lever 21. Obviously the device provides a means operative by manipulation of a single lever for adjusting the valve and for anchoring it securely in adjusted position.

For the purpose of limiting the angular movement of the valve, and to define the fully open and closed positions of the valve 14, a portion of the bottom of the sleeve 24 is cut away to form an arcuate slot 34 which in the assembly registers with a stop pin 35 upstanding from the cover 17.

Figure 2:
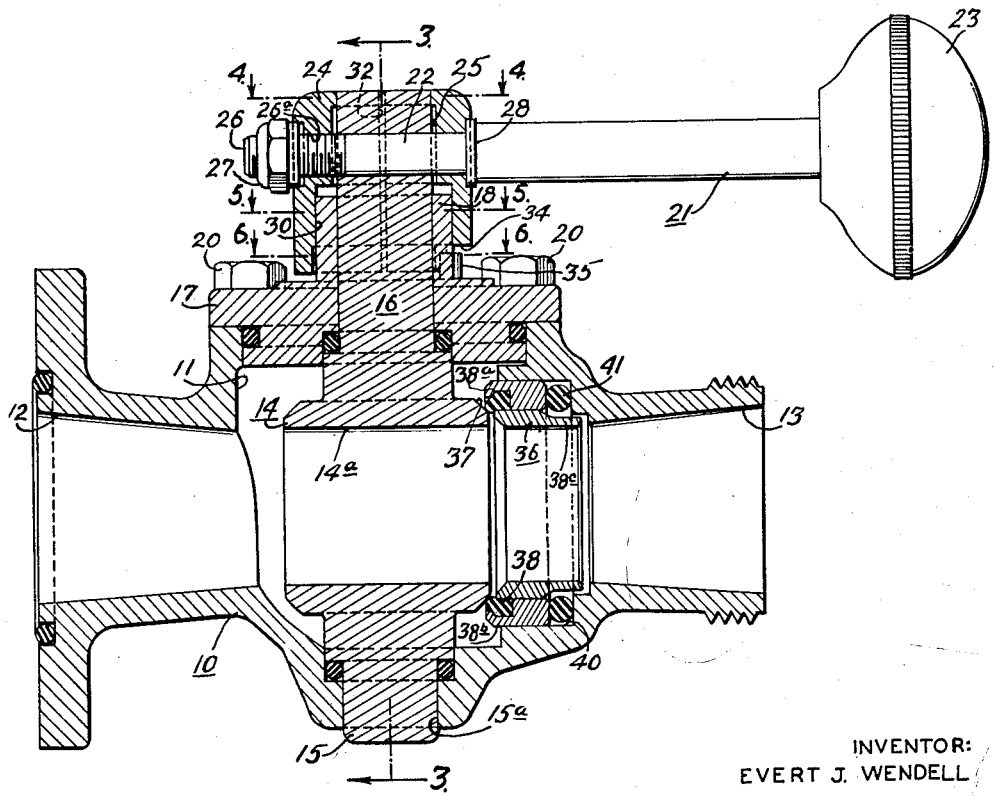
Fig. 2 is a medial, vertical sectional view on line 2—2 of Fig. 1 but showing the operating handle in elevation.

As a means for effectively seating the spherical valve 14 and to preclude leakage or by-passing of the valve regardless of the magnitude of the pressure or the direction of flow, the casing about the inner end of port 13 is counterbored to receive an annular insert 36. This insert provides an annular seat 37 for the spherical surface of the valve 14. The seat 37 itself is formed by a resilient gasket 38, in the form preferably of a plastic ring, set into the face of the insert. The ring 38, which may be of the shape shown in Fig. 10, occupies a recess 38a of complementary form in the inner end of the insert; and in the present instance the insert is composed of two sections 38b and 38c the meeting cylindrical faces of which intersect the recess 38a and which may be secured together after insertion of the formed ring by force-fitting or other suitable means so as to positively confine the ring while leaving a sufficient part projecting for pressure engagement with the cylindrical face of the valve element. As shown in Figs. 2 and 3, the diameter of the ring 38 is such that the ring completely embraces the bore 14a of the valve element when the latter is in the open position so as to seal off the said bore from the chamber 11 at the inner end of port 13.

The outer end of the insert 36 is provided with a circumferential groove 40 which forms with the confronting walls of the casing 11 a pocket for reception of a plastic ring 41. The ring 41 is preferably made of resilient substantially non-compressible material soft enough to flow under pressure for a purpose described below. The function of this ring is to seal and to prevent leakage through the joint between the insert 36 and the confronting walls of the casing. The manner in which the ring functions in this capacity is illustrated in the drawings. With reference to Figs. 2 and 7, it will be noted that the ring 41 is of greater diameter than the axial dimension of the groove 40, so that when the valve element 14 is installed in the casing, by first presenting the end of the loosely fitted trunnion 15 to the inner end of the journal bore 15a in the casing and then moving the valve laterally into pressure engagement with the seat ring 38, the insert 36 may be displaced axially to the extent required to admit the said trunnion to the bore and to subsequently secure the cover 17. In this operation the ring 41, as well as the ring 38, will be placed under axial pressure and will in effect be pre-loaded. If the port 12 is connected to the pressure source and the valve is closed, there will be a tendency toward leakage between the insert 36 and the casing wall from the chamber 11 to port 13. In such case pressure fluid entering the groove 40 will tend to contract the ring 41 radially as shown in Fig. 8.

In this contractive movement the ring will be forced against the inner circumferential wall of the groove and will be expanded axially by flow of the material so as to more positively seal the joint between the insert and the casing wall and at the same time exert increasing axial pressure against the insert 36 in the direction of the valve element 14 to force the ring 38 against the valve 14 and thereby to more positively seal the joint between the valve element and the insert. Fig. 9 illustrates the functioning of the ring 41 when the valve is closed and the fluid pressure is applied to the port 13. In this case the ring is expanded radially to the outer wall of the pocket and by flow of the non-compressible material is spread radially so as to press the insert toward the valve element and to increase the effectiveness of the seal as to both rings of the rings 41 and 38.

The insert 36 and the relative arrangement of the sealing rings 38 and 41 also provide for utilization of the fluid pressure by direct action upon the insert itself to render the sealing action of the ring 38 more effective. It should be noted that when the ring 41 is in the position of Fig. 8, the end surfaces of the insert exposed to the fluid pressure in the chamber 11, as measured for example from the outer circumference 36a of the ring to lines parallel to the axis of the insert and respectively intersecting the centers of contact between the ring 38 and the valve element and between the ring 41 and the end wall 36b of the insert, are of different effective areas, and that the latter surface area is the greater. In effect this is caused by the fact that the inner diameter of the groove 40 is such that the ring 41 may occupy an effective position closer to the axis of the insert than does the ring 38. The force exerted by the fluid pressure against the outer end of the insert, i.e. the end engaged by the ring 41, will be greater, therefore, than the force of the pressure at the inner end, so that there will be a constant pressure tending to force the insert toward the valve element.

The same condition prevails when the ring 41 occupies the position of Fig. 9. In this case also the exposed surface area differential at the opposite ends of the insert is in favor of the outer end, and the fluid pressure will tend to force the insert toward the valve element.

The opening and closing of the valve takes place by the manual operation of the lever 21 as previously described. With the valve in closed position the knob 23 is turned to clamp the sleeve 24 to the fixed collar 18 and to thereby lock the valve in its closed position. To open the valve the knob 23 is turned in the opposite direction to release the valve after which the lever 21 may be operated to open the valve. Such opening movement is indicated by the arrow in Fig. 1. With the valve open, the knob 23 is again rotated to lock the valve in the adjusted position.

In the movement of the valve between the open and closed positions the seating ring 38 is in continuous forced contact with the spherical face of the valve but not throughout its entire circumference. The construction provides, however, for relative ease of manual operation of the valve at high fluid pressures by balancing the atmospheric pressures upon the valve element 14. Thus, the trunnion 15 and the stem 16 are both exposed at their ends to atmosphere, and the effective exposed surface areas are the same. Perfect balance is insured.

The construction provides also for access to the interior of the valve for servicing by removal of the cover 17 and withdrawal of the integral valve element and stem. The casing may be provided at both ends with threads for permanent installation in a pipe line since servicing does not require removal of the casing from the line.

I claim:

1. A valve comprising a casing having ports and a rotary valve element for controlling flow of pressure fluid between said ports, an annular sealing member mounted for axial movement in the casing in registration with one of said ports and having at least a part of one axial end surface in annular seating engagement with the valve element, a sealing ring of resilient substantially non-compressible material confined closely between a radially directed surface of said annular member and a confronting relatively fixed surface of the casing around said one port, said surfaces forming the side walls of an annular chamber embracing the said port and containing said ring, inner and outer peripheral walls for said chamber confining the ring radially, the radial dimensions of said chamber exceeding the radial dimensions of the ring so as to permit radial expansion and contraction of the ring in the chamber, means for affording free access for pressure fluid from one of said ports to the outer peripheral side only of the chamber and of the ring and for affording free access for pressure fluid from the other of said ports to the inner peripheral side only of the chamber and of the ring so that the fluid energy applied to the ring will tend to displace the ring radially in the chamber into compressive engagement with that one of the said peripheral walls of the chamber which is relatively remote from the port from which the pressure is applied and will thereby act to expand the ring axially to seal the potential paths of leakage along said radially directed side walls of the chamber and to cause the ring to exert axial thrust on the annular member urging the member against the valve element, said radial displacement serving also to expose directly to the pressure fluid causing the displacement all of the said side wall surface of the annular member in the chamber not engaged with the said ring, whereby the total energy of the pressure fluid is translated by direct contact and through the said ring into axial thrust over the entire area of the said wall surface of the annular member in the chamber to urge the member against the valve element, said thrust area exceeding the area of the sealing member at its seating end, including at least a half of the seated area of the member, against which fluid pressure from either port may exert axial thrust tending to unseat the sealing member from the valve element.

2. A valve according to claim 1 wherein the resilient ring is confined under prestress between the said radial side wall surfaces of the chamber.

3. A valve comprising a casing having ports and a rotary valve element for controlling flow of pressure fluid between said ports, an annular sealing member mounted for axial movement in the casing in registration with one of said ports and having at least a part of one axial end surface in annular seating engagement with the valve element, a sealing ring of resilient, substantially non-compressible material confined closely between a radially directed surface of said annular member and a confronting, relatively fixed surface of the casing around said one port, said surfaces forming the side walls of an annular chamber embracing the said port and containing said ring, inner and outer peripheral walls for said chamber confining the ring radially, the radial dimension of said chamber between the inner and outer peripheral surfaces thereof exceeding the corresponding radial dimension of the ring so as to permit radial expansion and contraction of the ring in the chamber, means for affording free access for pressure fluid from one of said ports to the outer peripheral side only of the chamber and of the ring and for affording free access for pressure fluid from the other of said ports to the inner peripheral side only of the chamber and of the ring, so that the fluid energy applied to the ring will tend to displace the ring radially in the chamber into compressive engagement with that one of the said peripheral walls of the chamber which is relatively remote from the port from which the pressure is applied and will thereby act to expand the ring axially to seal the potential paths of leakage along said radially directed side walls of the chamber and to cause the ring to exert axial thrust on the annular member urging the member against the valve element, said radial displacement serving also to expose directly to the pressure fluid causing the displacement all of the said side wall surface of the annular member in the chamber not engaged with the said ring, whereby the total energy of the pressure fluid is translated by direct contact and through the said ring into axial thrust over the entire area of the said wall surface of the annular member in the chamber to urge the member against the valve element, the said thrust area within the chamber plus any surface area at the chamber end of the sealing member exterior to the chamber and against which fluid pressure from either port, individually, may exert thrust tending to seat the sealing member, materially exceeding the total surface area at the sealed end of the sealing member including all of the seated area of said member against which the same fluid pressure may exert axial thrust tending to unseat the sealing member from the valve element.

4. A valve comprising a casing having ports and a rotary valve element for controlling flow of pressure fluid between said ports, an annular sealing member mounted for axial movement in the casing in registration with one of said ports and having at least a part of one axial end surface in annular seating engagement with the valve element, a sealing ring of resilient, substantially non-compressible material confined closely between a radially directed surface of said annular member and a confronting, relatively fixed surface of the casing around said port, said surfaces forming the side walls of an annular chamber embracing the said port and containing said ring, inner and outer peripheral walls for said chamber confining the ring radially, means affording free access for pressure fluid from said ports to the chamber on opposite sides, respectively, of the ring so that the total energy of the pressure fluid entering the chamber from either port is translated into axial thrust over the entire area of the said wall surface of the annular member in the chamber to urge the member against the valve element, the thrust area within the chamber plus any surface area at the chamber end of the sealing member exterior to the chamber against which fluid pressure from either port, individually, may exert thrust tending to seat the sealing member against the valve element materially exceeding the total surface area at the sealed end of the sealing member, including at least one half of the seated area of said member against which the same fluid pressure may exert axial thrust tending to unseat the sealing member from the valve element.

5. A valve comprising a casing having ports and a rotary valve element for controlling flow of pressure fluid between said ports, an annular sealing member mounted for axial movement in the casing in registration with one of said ports and having at least a part of one axial end surface in annular seating engagement with the valve element, a sealing ring of resilient, substantially non-compressible material confined closely between a radially directed surface of said annular member and a confronting, relatively fixed surface of the casing around said port, said surfaces forming the side walls of an annular chamber embracing the said port and containing said ring, inner and outer peripheral walls for said chamber confining the ring radially, means affording free access for pressure fluid from said ports to the chamber on opposite sides, respectively, of the ring so that the total energy of the pressure fluid entering the chamber from either port is translated into axial thrust over the entire area of the said wall surface of the annular member in the chamber to urge the member against the valve element, the thrust area within the chamber plus any surface area at the chamber end of the sealing member exterior to the chamber against which fluid pressure from either port, individually, may exert thrust tending to seat the sealing member against the valve element materially exceeding the total surface area at the sealed end of the sealing member, including all of the seated area of said member against which the same fluid pressure may exert axial thrust tending to unseat the sealing member from the valve element.

(References on following page)

References Cited in the file of this patent

UNITED STATES PATENTS

| | | |
|---|---|---|
| 1,272,998 | Rasmussen | July 16, 1918 |
| 1,879,481 | Putnam | Sept. 27, 1932 |
| 2,109,042 | Bennett | Feb. 22, 1938 |
| 2,521,659 | Wendell | Sept. 5, 1950 |
| 2,529,412 | Parker | Nov. 7, 1950 |
| 2,578,396 | Brown | Dec. 11, 1951 |
| 2,628,060 | Parker | Feb. 10, 1953 |
| 2,628,809 | Mikeska | Feb. 17, 1953 |
| 2,653,791 | Mueller | Sept. 29, 1953 |
| 2,665,879 | Housekeeper | Jan. 12, 1954 |
| 2,796,230 | Grove | June 18, 1957 |

FOREIGN PATENTS

| | | |
|---|---|---|
| 716,610 | Great Britain | Oct. 13, 1954 |